United States Patent
Brouwers et al.

(10) Patent No.: US 8,012,245 B2
(45) Date of Patent: Sep. 6, 2011

(54) METHOD AND DEVICE FOR REDUCING FORMATION OF PARTICULATE MATTER IN GAS STREAMS

(75) Inventors: Jozef Johannes Hubertus Brouwers, Lanaken (BE); Henricus Petrus van Kemenade, Eindhoven (NL); Ingwald Obernberger, Graz (AT); Thomas Brunner, Graz (AT)

(73) Assignee: Technische Universiteit Eindhoven, Eindhoven (NL)

( * ) Notice: Subject to any disclaimer, the term of this patent is extended or adjusted under 35 U.S.C. 154(b) by 230 days.

(21) Appl. No.: 12/296,337

(22) PCT Filed: Apr. 10, 2007

(86) PCT No.: PCT/NL2007/050149
§ 371 (c)(1),
(2), (4) Date: Jul. 14, 2009

(87) PCT Pub. No.: WO2007/117143
PCT Pub. Date: Oct. 18, 2007

(65) Prior Publication Data
US 2009/0308245 A1    Dec. 17, 2009

(30) Foreign Application Priority Data
Apr. 7, 2006 (NL) ................................... 2000048

(51) Int. Cl.
*B01D 53/00* (2006.01)
(52) U.S. Cl. ................ 95/288; 95/39; 95/40; 55/315.2; 55/434.2; 55/434.3; 55/434.4; 55/467.1; 55/490.1; 55/490.2

(58) Field of Classification Search ............... 55/315.2, 55/434.2, 434.3, 434.4, 467.1, 490.1, 490.2; 95/39, 40, 288
See application file for complete search history.

(56) References Cited

U.S. PATENT DOCUMENTS

| 4,284,609 A | 8/1981 | deVries |
| 4,334,898 A * | 6/1982 | Zhuber-Okrog et al. .... 55/434.4 |
| 4,533,584 A | 8/1985 | Takeuchi et al. |
| 4,919,696 A * | 4/1990 | Higashi et al. ............... 55/434.4 |
| 7,682,426 B2 * | 3/2010 | Burtscher et al. ............... 95/288 |
| 2002/0020159 A1 | 2/2002 | Givargis |
| 2002/0069825 A1 | 6/2002 | Saito |

FOREIGN PATENT DOCUMENTS
DE 29604521 U1 6/1996
(Continued)

OTHER PUBLICATIONS

Search Report for Netherlands Patent Application No. 2000048; Dec. 12, 2006.
(Continued)

*Primary Examiner* — Jason M Greene
*Assistant Examiner* — Dung Bui
(74) *Attorney, Agent, or Firm* — Jason A. Bernstein; Barnes & Thornburg LLP

(57) ABSTRACT

A method and device for the reduction of particulate forming vapors in gases, the method comprising passing the gas stream through at least one channel (12) that has a wall temperature that is lower than the condensation temperature of the vapor, the at least one channel having a hydraulic diameter $(D_h)$ satisfying the condition that $D_h < [24/(N\pi d_o)]^{1/2}$, where N is the number of nuclei present in the gas stream and $d_o$ is the initial diameter of the nuclei.

6 Claims, 2 Drawing Sheets

FOREIGN PATENT DOCUMENTS

| | | | |
|---|---|---|---|
| EP | 1072765 | A2 | 1/2001 |
| GB | 1426491 | | 2/1976 |
| GB | 2319191 | A | 5/1998 |
| JP | 2005240692 | A | 9/2005 |
| WO | 9518947 | A1 | 7/1995 |
| WO | 9523280 | A1 | 8/1995 |
| WO | 2007021670 | A2 | 2/2007 |

OTHER PUBLICATIONS

Search Report for International Patent Application No. PCT/NL2007/050149; Sep. 19, 2007.

* cited by examiner $D_h = 2h$ $D_h = \dfrac{4ah}{2(a+h)}$ $D_h = \dfrac{2ah}{a+b+c}$ $D_h = 2r$ $D_h = D$ $D_h = D-d$

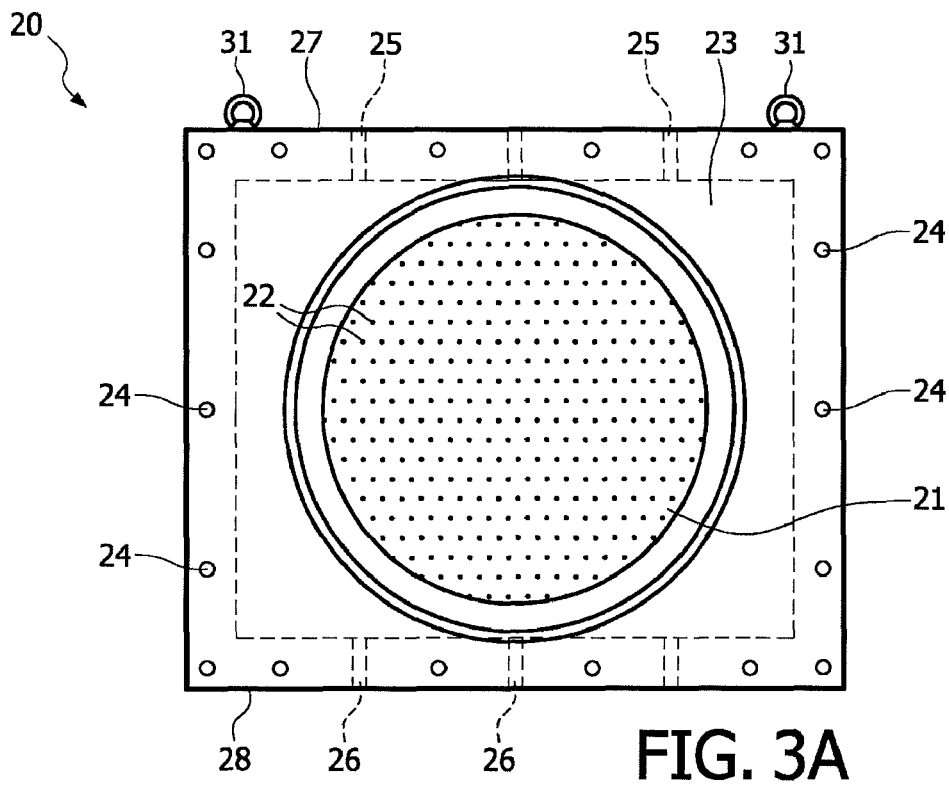
FIG. 3A
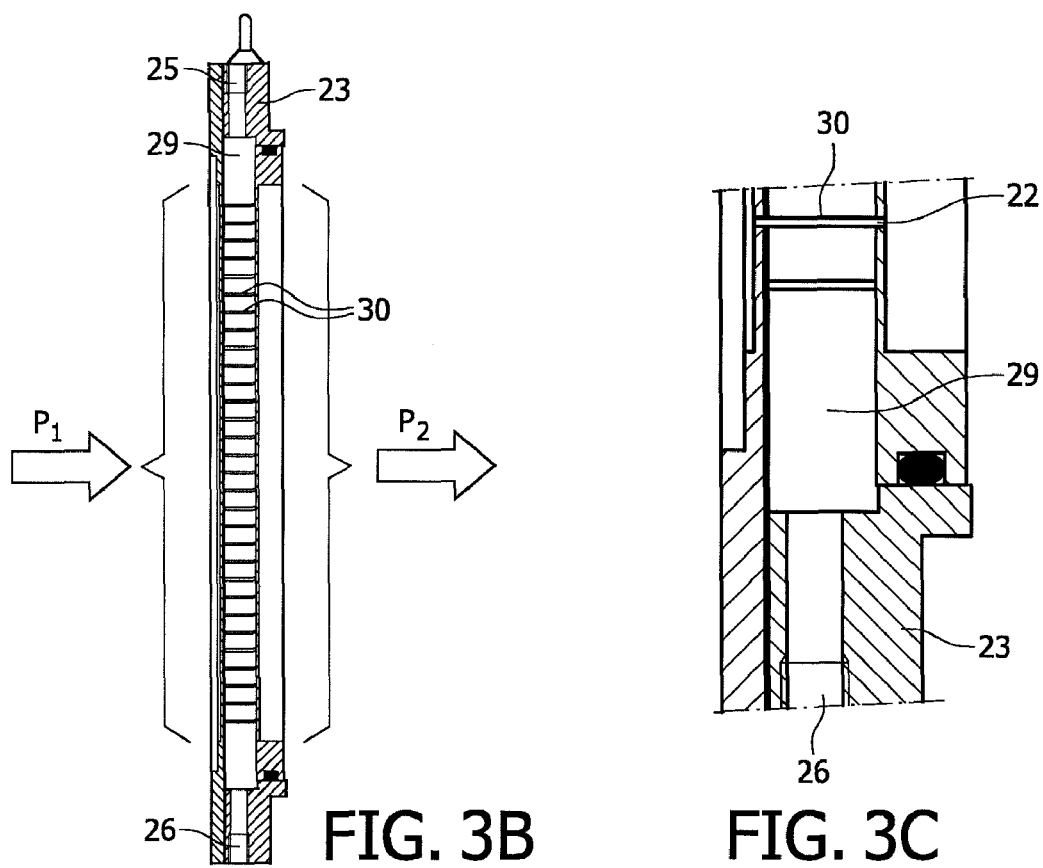
FIG. 3B
FIG. 3C

METHOD AND DEVICE FOR REDUCING FORMATION OF PARTICULATE MATTER IN GAS STREAMS

PRIORITY CLAIM

This patent application is a U.S. National Phase of International Patent Application No. PCT/NL2007/050149, filed Apr. 10, 2007, which claims priority to Netherlands Patent Application No. 2000048, filed Apr. 7, 2006, the disclosures of which are incorporated herein by reference in their entirety.

FIELD

The present disclosure relates to a method and device for the reduction of particulate forming vapors in gases, preferably by at least 50%, based on an incoming concentration of less than 1 gram per cubic meter, thus reducing the formation of particulate matter.

BACKGROUND

In several situations it is undesirable that small particulates (in which small means an aerodynamic diameter of typically smaller than 1 μm) are present in a gas. Consider, for instance, production conditions where an extremely pure environment is desired ("clean room" conditions), or alternatively consider conditions where small particles are harmful for the living environment. In general, particulate matter below 1 μm are formed by condensation or desublimation during a cooling process or due to chemical reactions. Amongst other conditions, these can occur in situations like coal combustion, biomass combustion, other flue gases, cement production, other process gases, gas from natural gas wells, and the like. In general, the concentration of particulate forming vapors under these conditions is less than 1 gram per cubic meter referring to solid particles in dry gas conditions.

Particulates with an aerodynamic diameter under 1 μm have such a small size and mass that the particulates will follow the flow pattern of the gas. Consequently, the particulates can hardly be separated from the gas stream by mechanical means. For purposes of the present disclosure, the term mechanical separation means separation using mass difference, such as by using a cyclone, vortex or rotational particle separator. To be able to clean at least partially, nevertheless, according to methods known in the art, very fine meshed filter materials are used, for instance, like cloth filters or "in-depth" filters. The drawback of such filters is that these filters can bring on a considerable pressure drop in the gas stream and that the filters can become blocked relatively quickly due to sticky particulates. Another technique utilizes electrostatic precipitators, but the use of electrostatic precipitators involves large fixed costs and is relatively expensive when applied to installations with limited throughputs of polluted gases. Moreover, the technique only works well for particulate material which can be sufficiently electrically charged.

European Patent Application No. 1 072 765 describes a method and device for separating small particles, in particular, soot particles, from exhaust gas of combustion engines using diffusion. Oxidation of the soot particles using $NO_2$, which is converted by means of a catalyst into NOE is described in European Patent Application No. 1 072 765. The principle of Van der Waals forces occurring in a colder boundary layer of the exhaust gas close to a cold wall is also described. It is stated with respect to particle size that this is very much smaller than 700 nm. It is further indicated that it is desirable to shorten the diffusion path of the particles by reducing the cross-section of the channels. Usable channel cross-sections of 25 μm-250 μm are mentioned, and the maximum path to be covered by the particles is limited to less than 30 μm. Such channels are difficult to produce and require very frequent maintenance.

Therefore, it would be desirable to have a method and apparatus which could reduce the amount of particulate forming vapors in gases, thus reducing the particulate emissions below 1 μm by 50% without the drawbacks currently seen in the art.

SUMMARY

The present disclosure describes several exemplary embodiments of the present invention.

One aspect of the present disclosure provides a method for the reduction of particulate forming vapors in gases, the method comprising passing the gas stream through at least one channel having a wall temperature that is lower than the condensation temperature of the vapor, said at least one channel having a hydraulic diameter ($D_h$) satisfying the condition that $D_h < [24/(N\pi d_0)]^{1/2}$, where N is the number of nuclei present in the gas stream and $d_0$ is the initial diameter of the nuclei, and wherein $0.5 < D_h < 10$.

Another aspect of the present disclosure provides a gas cleaner for the reduction of particulate forming vapors in gases by at least 50% based on an incoming concentration of less than 1 gram per cubic meter referring to solid particles in dry gas conditions, the gas cleaner comprising at least one channel that has a hydraulic diameter ($D_h$) satisfying the condition that $D_h < [24/(N\pi d_0)]^{1/2}$, where N is the number of nuclei present in the gas stream and $d_0$ is the initial diameter of the nuclei.

BRIEF DESCRIPTION OF THE DRAWINGS

Various aspects of the present disclosure are described herein below with reference to the accompanying figures, which are non-limiting examples of designs and in which like reference numerals represent like parts throughout the drawings.

FIG. 3A is a front elevation view of one view of an alternative exemplary embodiment for a gas cleaner according to the present disclosure;

FIG. 3B is a side elevation view of an alternative exemplary embodiment for a gas cleaner according to the present disclosure; and FIG. 3C is a schematic cross sectional view of an alternative exemplary embodiment for a gas cleaner according to the present disclosure.

DETAILED DESCRIPTION

Figure 1A:
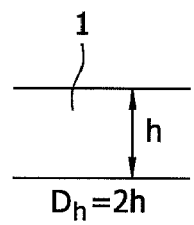
FIG. 1A is a schematic diagram for the cross section of the channel of a gas cleaner according to one exemplary embodiment with a calculation of the hydraulic diameter ($D_h$) for the corresponding cross section.
Figure 1B:
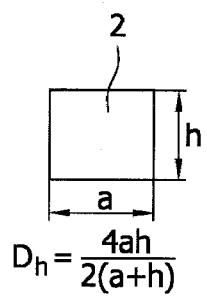
FIG. 1B is a schematic diagram for the cross section of the channel of a gas cleaner according to a second exemplary embodiment of the hydraulic diameter ($D_h$) for the corresponding cross section.
Figure 1C:
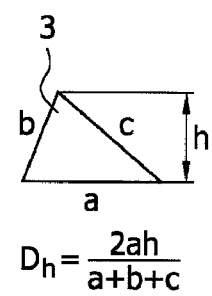
FIG. 1C is a schematic diagram for the cross section of the channel of a gas cleaner according to a third exemplary embodiment of the hydraulic diameter ($D_h$) for the corresponding cross section.
Figure 1D:
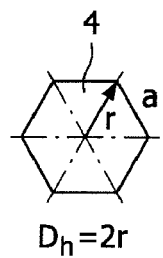
FIG. 1D is a schematic diagram for the cross section of the channel of a gas cleaner according to a fourth exemplary embodiment with a calculation of the hydraulic diameter ($D_h$) for the corresponding cross section.
Figure 1E:
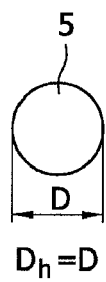
FIG. 1E is a schematic diagram for the cross section of the channel of a gas cleaner according to a fifth exemplary embodiment with a calculation of the hydraulic diameter ($D_h$) for the corresponding cross section.
Figure 1F:
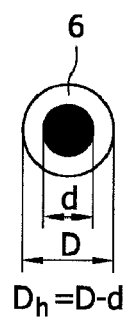
FIG. 1F is a schematic diagram for the cross section of the channel of a gas cleaner according to a sixth exemplary embodiment with a calculation of the hydraulic diameter ($D_h$) for the corresponding cross section.

The present disclosure provides a method for condensing or desublimating particulate-forming vapors comprising, in one exemplary embodiment, passing a gas stream through at least one channel that has having a wall temperature that is lower than the condensation temperature of the vapor, that has at least channel having a hydraulic diameter ($D_h$) satisfying the condition that $D_h<[24/(N\pi d_0)]^{1/2}$, where N is the number of nuclei present in the gas stream and $d_0$ is the initial diameter of the nuclei, and wherein $0.5<D_h<10$. Particulate-forming vapors in gases are removed from a gas flow on the basis of diffusion, a principle wherein particles that are already present are captured. This, therefore, results in a very different dimensioning of the channel size. For purposes of the present disclosure, the hydraulic diameter $D_h$ is four times the cross-section divided by the wetted perimeter of the channel. For further clarification of $D_h$, reference is made to the accompanying FIGS. 1A-1F. More preferably, $D_h$ is $1<D_h<10$, while even more preferably, $D_h$ 2 is $<D_h<10$. The condition that $0.5<D_h<10$ means, in practice, that the lower limit of the distance between the wall parts in the most extreme case (the exemplary embodiment according to FIG. 1A at a lower limit of $D_h=0.5$) is 0.25 mm (in the preferred exemplary embodiment therefore 0.5 mm and 1 mm respectively), while the upper limit of the distance between the wall parts (the exemplary embodiment according to FIG. 1E at an upper limit of $D_h=10$) is 10 mm. When channels are closed (such as the exemplary embodiments according to FIGS. 1B-1F), this will result in typical surface areas of the channel cross-sections in the range of 3-25 mm², while in the case of parallel plates (such as the exemplary embodiment according to FIG. 1A) this results in a placing distance of 0.25-5 mm (in the preferred exemplary embodiment therefore 0.5-5 mm and 1-5 mm respectively). These values are much higher than the values found in the art. The channels are, therefore, larger with a more efficient production and more efficient maintenance.

In one exemplary embodiment of the method according to the present disclosure, the particulate forming vapors are reduced by at least 50% based on an incoming concentration of less than 1 gram per cubic meter referring to solid particles in dry gas conditions. The surface of the channel wall exceeds the surface offered by the nuclei so that more than 50% of the vapor condenses at the channel wall.

In another exemplary embodiment, the length of the channel (L) is such that: $L>Q_v \ln(2)/(8\pi D_m)$, where $Q_v$ denotes the volume flow through the channel and $D_m$ the molecular diffusion coefficient. With this exemplary embodiment, at least 50% of the particulate forming vapor with a concentration less than 1 g per cubic meter referring to solid particles in dry gas conditions can be condensed or desublimated on the wall of the channel thus reducing the emission of particulate matter smaller than 1 µm by at least 50% and so achieving good cleaning of the gas without the drawbacks found in the art. Using this very simple and compact method, particulate matter can be reduced in gases without requiring much maintenance or cleaning. Depending on the chosen form, cross section and length of the channel, a considerably larger reduction of particulate matter can be achieved than the previously 50% discussed hereinabove. This relates emphatically to a lower limit, and improved performance can be achieved using the method of the present disclosure.

To obtain good migration from the vapor molecules towards the walls, it is preferred if the gas is passed through a channel in which every position is less than 2 mm away from the channel walls. Furthermore, it is usual that the channel walls have a lower temperature than the condensation temperature of the vapor.

The present disclosure also provides a gas cleaner for reducing the formation of particle matter with an aerodynamic diameter smaller than 1 µm. The gas cleaner consists of at least one channel that has a hydraulic diameter ($D_h$) satisfying the condition that $D_h<[24/(N\pi d_0)]^{1/2}$, where N is the number of nuclei present in the gas stream and $d_0$ is the initial diameter of the nuclei.

In one exemplary embodiment of the gas cleaner, the length of the channel (L) is such that: $L>Q_v \ln(2)/(8\pi D_m)$, where $Q_v$ denotes the volume flow through the channel and $D_m$ the molecular diffusion coefficient. To obtain good migration from the vapor molecules towards the walls, it is preferred if the gas is passed through a channel in which every position is less than 2 mm away from the channel walls, for instance in the case of a circular cross section with a diameter less than 4 mm. With such a simple and very compact apparatus, the advantages mentioned hereinabove can be reached. In particular, the apparatus can be extremely compact; for instance, after a voluminous combustion chamber, the desired reduction of at least 50% in particulate matter can be reached with a length of the apparatus corresponding to the minimum channel length L of only a few centimeters.

To allow for condensation or desublimation of the particulate forming vapor, it is usually necessary to provide the gas cleaner with cooling means on the outside of the channel. That way the channel walls can be cooled below the temperature at which the vapor pressure of a certain compound equals the saturation vapor pressure actively or passively. For easy handling and/or a solid construction, it is advantageous if the gas cooler is provided with a housing wherein the cooling means and the channels are combined.

To enhance the capacity of the gas cleaner, the gas cleaner is usually equipped with several, mainly parallel channels. That way the capacity of the gas cleaner can be enlarged linearly with the number of channels. Preferably the channels connect to a central header.

For removal of the condensate from the channel walls, the apparatus is preferably equipped with a cleaning installation. This installation can be mechanical, for instance, using brushes, scrapers, pistons or soot blowers.

Figure 2:
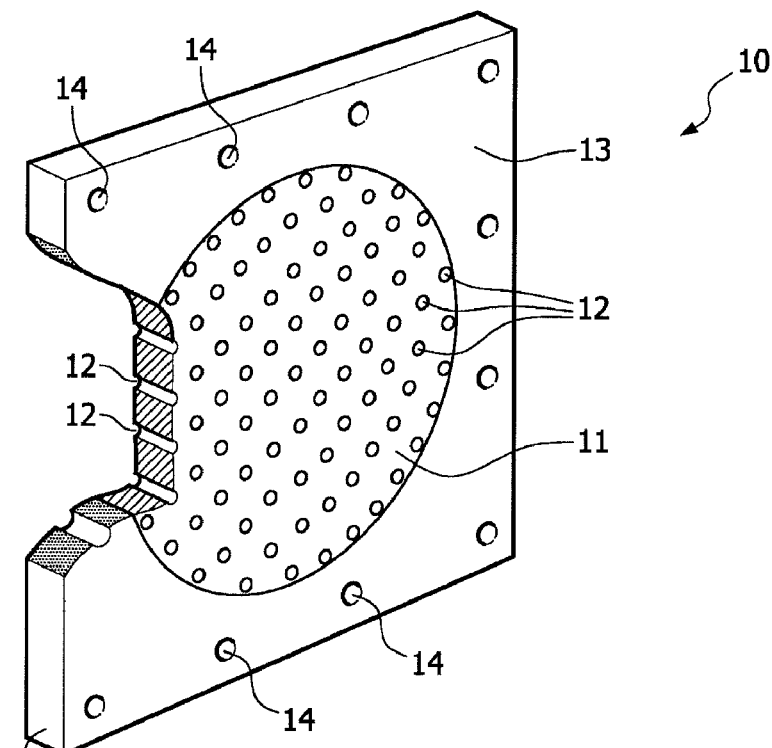
FIG. 2 is a perspective view of a gas cleaner according to one exemplary embodiment of the present disclosure.

The gas cleaner 10 shown in FIG. 2 is equipped with a central part 11 through which a large number of channels 12 are fed. In the channels 12, condensation of the particulate forming vapors takes place (the particles are not shown). The central part 11 is connected to a flange 13 equipped with mounting holes 14 for mounting the gas cleaner 10 to a gas supply and/or outlet.

FIGS. 3A-3C depict a gas cleaner 20 equipped with a central part 21 through which a large number of channels 22 are fed. In the channels 22, condensation of the particulate forming vapors takes place. The central part 21 is connected to a flange 23 equipped with mounting holes 24 for mounting the gas cleaner to a gas supply and/or outlet. The flange 23 is hollow, such that one side end 27 is equipped with supply channels 25 for a cooling medium and such that the other end 28 is equipped with outlet channels 26 for the cooling medium. Through the channels 25, 26 a cooling medium can be fed, respectively drained to a central cooling area 29 in the flange. Tubes 30 extend through the cooling area 29 in which tubes 30 the condensation channels 22 are provided. The gas to be cleaned is supplied in the direction of arrow $P_1$. After cleaning, the gas is evacuated in the direction of arrow $P_2$. From the detailed view of the cross-section of FIG. 3B, as shown in FIG. 3C, it is visible that the channels 22 provided in the tubes 30 can have a very small diameter, for instance, 0.5-2.5 mm, in particular, about 1.0 mm. The length of the tubes 30 usually lies in the range of a few centimeters, preferably 1-5 cm, more preferably 2-3 cm. To be able to readily mount and demount the gas cleaner 20, two hoisting means 31 are provided.

All patents, patent applications and publications referred to herein are incorporated by reference in their entirety.

The invention claimed is:

1. A method for the reduction of particulate forming vapors in gases, the method comprising: passing a gas stream through at least one channel having a wall temperature that is lower than the condensation temperature of the vapor, said at least one channel having a hydraulic diameter ($D_h$) satisfying the condition that $D_h<[24/(N\pi d_0)]^{1/2}$, where N is the number of nuclei present in the gas stream and $d_0$ is the initial diameter of the nuclei, and wherein $0.5<D_h<10$.

2. The method of claim 1, wherein the particulate forming vapors are reduced by at least 50-% based on an incoming concentration of less than 1 gram per cubic meter of solid particles in dry gas conditions.

3. The method of claim 1, wherein the gas is passed through a channel with a length L so that $L>Q_v 1n(2)/(8\pi D_m)$, where $Q_v$ denotes the volume flow through the channel and $D_m$ denotes the molecular diffusion coefficient.

4. The method of claim 1, wherein the gas passes through a channel in which every position is less than 2 mm away from the channel wall.

5. The method of claim 1, wherein the channel wall is below the temperature at which the vapor pressure of a certain compound equals the saturation vapor pressure.

6. The method of claim 1, wherein at least part of the wall of the channel can be cleaned of the condensate.

* * * * *